United States Patent [19]

Moriyasu et al.

[11] Patent Number: 4,825,035
[45] Date of Patent: Apr. 25, 1989

[54] CONTROL APPARATUS FOR ENERGY BEAM HARDENING

[75] Inventors: Masaharu Moriyasu; Takeshi Morita; Seigo Hiramoto; Osamu Hamada; Megumi Ohmine, all of Hyogo, Japan

[73] Assignee: Mitsubishi Denki Kabushiki Kaisha, Tokyo, Japan

[21] Appl. No.: 93,270

[22] Filed: Sep. 4, 1987

[30] Foreign Application Priority Data

Sep. 20, 1986 [JP] Japan .................................. 61-223365
Sep. 20, 1986 [JP] Japan .................................. 61-223366
Jun. 3, 1987 [JP] Japan .................................. 62-139179

[51] Int. Cl.$^4$ ............................................. B23K 26/00
[52] U.S. Cl. ............................... 219/121.61; 148/903; 219/121.62; 219/121.83
[58] Field of Search ...... 219/121 L, 121 LM, 121 LZ, 219/121 LA, 121 LB, 121 LC, 121 LD, 121 EB, 121 EA, 121 EM, 121 EF, 121 EG; 148/145, 146, 903, 121.6, 121.85, 121.83, 121.61, 121.62, 121.63, 121.64, 121.12, 121.35, 121.11, 121.16, 121.17

[56] References Cited

U.S. PATENT DOCUMENTS 4,121,087 10/1978 Malmuth et al. ............. 219/121 LB
4,646,737 3/1987 Hussein et al. ........... 219/121 LZ X

FOREIGN PATENT DOCUMENTS 2134670 8/1984 United Kingdom .

Primary Examiner—C. L. Albritton
Attorney, Agent, or Firm—Sughrue, Mion, Zinn, Macpeak and Seas

[57] ABSTRACT

A control apparatus for energy beam hardening which has an electromagnetic wave detector for detecting an electromagnetic wave irradiated from the surface of a hardened portion to which an energy beam is being emitted, a temperature converter for converting a detection signal from the electromagnetic wave detector to a temperature, hardening characteristics presuming means for presuming hardening characteristics by processing temperature distribution data from the temperature converter, energy beam deciding means for deciding the output and moving velocity of the energy beam emitted to obtain desired hardening characteristics and according to hardening characteristics to be presumed, and energy beam control means for controlling at least one of the output and moving velocity of the energy beam according to the output of the energy beam deciding means to thus suppress the irregularities in the hardening characteristics, thereby obtaining hardening characteristics of the hardened material as desired even if pretreating conditions and beam output of the material to be hardened are varied.

12 Claims, 9 Drawing Sheets

CONTROL APPARATUS FOR ENERGY BEAM HARDENING

BACKGROUND OF THE INVENTION

The present invention relates to a control apparatus for precisely controlling, for example, hardening depth and hardness of a hardened surface of carbon steel by a laser beam or an electron beam.

FIG. 9 is a perspective view showing a conventional laser hardening apparatus disclosed, for example, in Japanese Patent Publication No. 12726/1984 official gazette. In FIG. 9, reference numeral 1 designates a laser beam oscillated from a laser oscillator, numeral 2 designates a hardened material such as carbon steel, and numeral 3 designates a hardened portion formed on the surface of the hardened material 2. Reference numeral 4 designates a moving direction of the hardened material 2, which moves at a speed V.

The conventional laser hardening apparatus is constructed as described above, and the laser beam 1, and the material 2 to be hardened moves in a direction of an arrow 4 at the speed V while the hardened material 2 is being emitted by the laser beam 1. A temperature hysteresis at an arbitrary position of the hardened material 2 in this process is shown in FIG. 10. In FIG. 10, an abscissa axis indicates time, an ordinate axis indicates temperature, and symbols Ms, $Ac_3$ and Tmp denote martensite transformation temperature, austenite transformation temperature and melting temperature, respectively. When the beam is emitted, the material is heated from a time 0 to a time $t_1$, maintained at the temperature equal to and higher than the austenite transformation temperature $Ac_3$ from the time $t_1$ to a time $t_2$, the beam emission is then completed, and the material is cooled after the time $t_2$. The cooling velocity of the material 2 to be hardened in this cooling step is sufficient to cause the martensite transformation to occur in the material with the result that the laser emitted portion is hardened. An example of hardness distribution in the section of the hardened portion of the material 2 is shown in FIG. 11.

In the above-described conventional laser hardening method, hardening conditions such as the output of the laser beam and the hardening velocity of the material 2 to be hardened have been set in advance before hardening, and the hardening conditions has not been altered during the hardening step. When the pretreating conditions of the material 2 to be hardened and the output of the laser beam are varied, a drawback arises that the temperature hysteresis shown in FIG. 10 is similarly altered so that the hardening depth and hardness of the material to be hardened cannot be obtained as set.

SUMMARY OF THE INVENTION

An object of the present invention is to provide a control apparatus for energy beam hardening which can eliminate the above-mentioned drawbacks and can obtain hardening characteristics of a hardened material as desired even if pretreating conditions and beam output of the material to be hardened are varied.

In order to achieve the above and other objects, there is provided according to the present invention a control apparatus for energy beam hardening comprising an electromagnetic wave detector for detecting an electromagnetic wave irradiated from the surface of a hardened portion to which an energy beam is being emitted, a temperature converter for converting a detection signal from the electomagnetic wave detector to a temperature, hardening characteristics presuming means for presuming hardening characteristics by processing temperature distribution data from the temperature converter, energy beam deciding means for deciding the output and moving velocity of the energy beam emitted to obtain desired hardening characteristics and according to hardening characteristics to be presumed, and energy beam control means for controlling at least one of the output and moving velocity of the energy beam according to the output of the energy beam deciding means, thereby suppressing the irregularities in the hardening characteristics.

In the control apparatus according to the present invention, the temperature distribution of the surface of the hardened portion of the material to be hardened is monitored, and when temperature distribution for affecting the hardening characteristics to vary occurs, the temperature distribution is immediately fed back to the hardening conditions to control them, thereby suppressing the irregularities in the hardening characteristics.

DETAILED DESCRIPTION OF THE PREFERRED EMBODIMENTS

Figure 1:
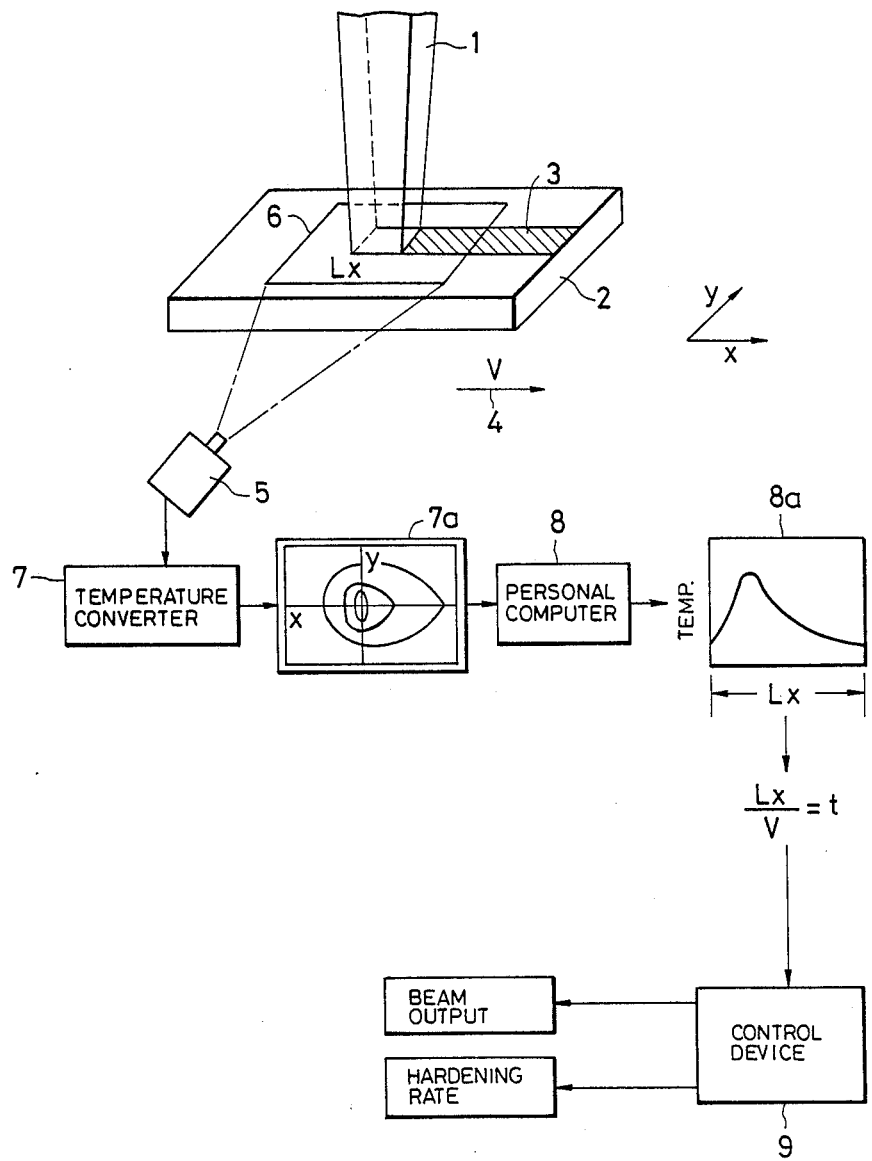
FIG. 1 is a view showing the construction of a control apparatus for energy beam hardening according to an embodiment of the present invention.

An embodiment of the present invention will be described in detail with reference to the accompanying drawings. In FIG. 1, a control apparatus of the present invention comprises an electromagnetic wave detector for detecting an electromagnetic wave irradiated from the surface of a hardened portion of a material to be hardened to which an energy beam is emitted, i.e., an infrared ray detector in this embodiment. Reference numeral 6 designates a measuring range of the infrared ray detector 6 such as, for example, a square having 20 mm of one side. In this embodiment, the infrared ray detector 5 is disposed at a position perpendicular to the moving direction 4 of the material 2 to be hardened so that the laser beam 1 and the infrared ray detector 5 do not relatively move, i.e., are fixed in their positional relationship. The control apparatus further comprises a temperature converter 7 for converting a detection signal from the infrared ray detector 5 to a temperature such as, for example, a scan type infrared ray thermometer combined with the infrared ray detector 5 and the temperature converter 7 as sold in the market. Symbol 7a depicts temperature distribution data from the temperature converter 7, and reference numeral 8 denotes, for example, a 16-bit personal computer which operates as hardening characteristic presuming means for presuming hardening characteristics from a temperature hysteresis 8a obtained by processing the temperature distribution data 7a to obtain a temperature hysteresis 8a of the hardened portion 3 of the material 2, and energy beam deciding means for deciding the output and moving velocity V of the energy beam 1 emitted to obtain desired hardening characteristics according to the presumed hardening characteristics. The control apparatus further comprises energy beam control means 9 for controlling the output and moving velocity V 4 of the energy beam according to the output of the energy beam deciding means, i.e., the personal computer 8 to be, for example, executed by an numerical control NC attached to a general laser working machine.

Figure 2:
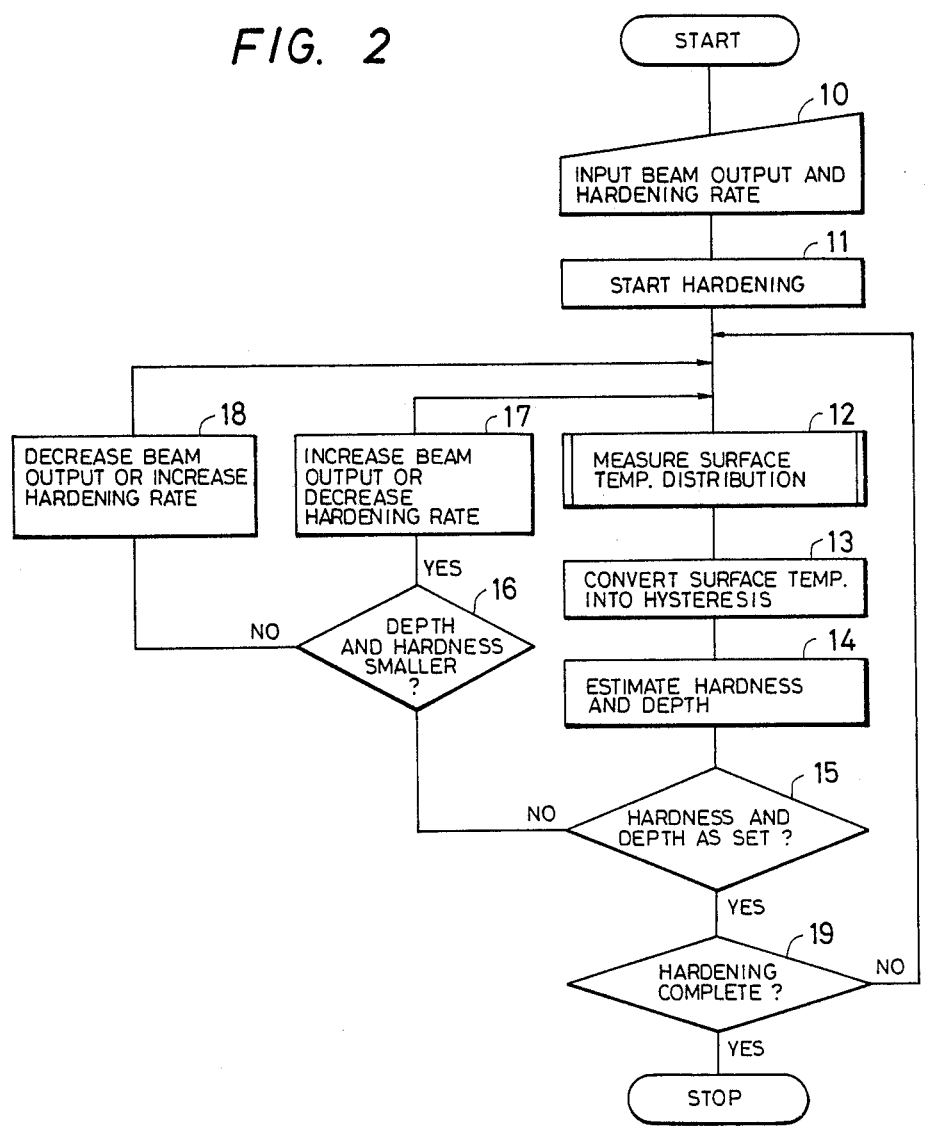
FIG. 2 is a flowchart for describing the operation of the apparatus in FIG. 1.

FIG. 2 is a flowchart for describing the operation of the control apparatus in FIG. 1.

Figure 10:
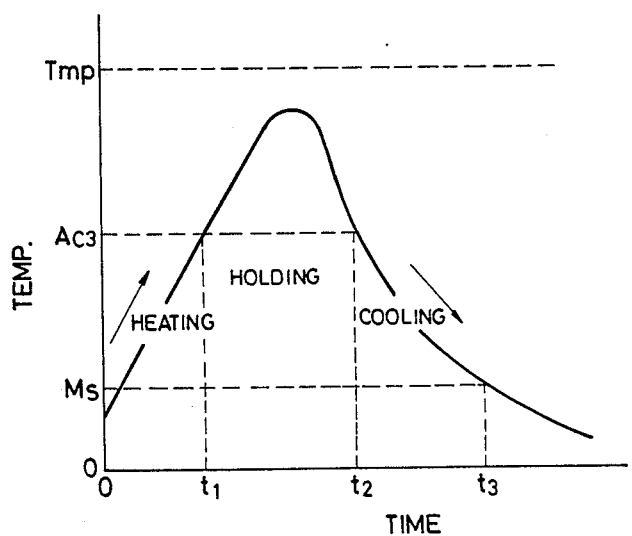
FIG. 10 is a graph showing a temperature hysteresis of a hardened material.
Figure 11:
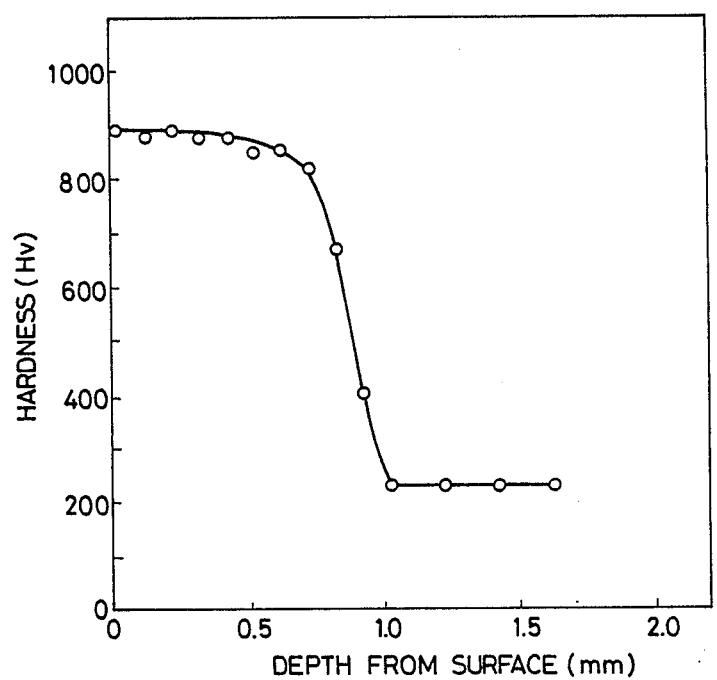
FIG. 11 is a graph showing a hardness distribution of the section of a hardened portion of the hardened material.

In the control apparatus for energy beam hardening constructed as described above, a beam output and a hardening velocity are input in step 10, and a hardening step is then started in step 11. An electromagnetic wave irradiated from the surface of a hardened portion of the material 2 to be hardened to which the energy beam is emitted is detected by the infrared ray detector 5, a detection signal from the detector 5 is, in turn, converted by the temperature converter 7 to a temperature to obtain a temperature distribution data 7a in step 12. The temperature distribution data 7a corresponds to the moving direction 4 of the hardened material 2 in an X-axis, and a Y-axis corresponds to the direction perpendicular to the moving direction 4 of the material 2. The temperature distribution data 7a is input to the personal computer 8 to be converted to a surface temperature hysteresis 8a in step 13. Here, the abscissa axis of the temperature hysteresis is the X-axis of the temperature distribution, with the measuring range length Lx of the infrared ray detector 5, where the Lx is divided by the moving velocity V of the hardened material 2 (Lx/V) to convert to a time base. More particularly, this calculation obtains ageing temperature change of the hardened portion of the material 2 to which the laser beam is emitted. When the temperature hysteresis is obtained, heating, temperature holding and cooling steps can be provided as shown in FIG. 10. It is necessary to set the maximum arriving temperature equal to or higher than Ac$_3$ and lower than Tmp in the temperature hysteresis curve to harden the material 2 to be hardened, and further necessary that the value represented by the mean value of cooling velocity $(\partial T/\partial t)_{t=t_2}$ at a time t$_2$ and cooling velocity $(\partial T/\partial t)_{t=t_3}$ at a time t$_3$ for passing the point Ms is equal to or higher than the critical cooling velocity for performing the martensite transformation in the material 2 to be hardened. Carbon steel is hardened only when these hardening conditions are satisfied. The maximum hardness is obtained from the cooling velocity, and the hardening depth is obtained from the maximum arriving temperature and the temperature holding time (t$_2$−t$_1$) higher than Ac$_3$ by a calculation processor, i.e., the personal computer by referring to data base stored therein in step 14. Then, the presumed hardening characteristics are compared with desired values (set initially) in step 15, and if the presumed hardening characteristics are different from the set values, the output and hardening velocity of the energy beam are decided to increase or decrease so as to obtain desired hardening characteristics in steps 16 to 18. The output and moving velocity of the energy beam are controlled by the energy beam control means 9 according to the output from the energy beam deciding means and hence the personal computer 8. If the presumed hardening characteristics are desired value, the process is returned to the step 12 of measuring the temperature distribution of the surface of the hardened portion of the material 2 to be hardened, and these steps are repeated until the hardening of the material 2 to be hardened is finished.

Detecting element of the infrared ray detector 5 is, for example, InSb, PbSe, or PbS, or may be an Si sensor having shorter detecting wavelength. The temperature detector for 400° to 1000° C. for the hardening steps preferably employs 0.7 to 15 microns of wavelength according to experiments.

Figure 3:
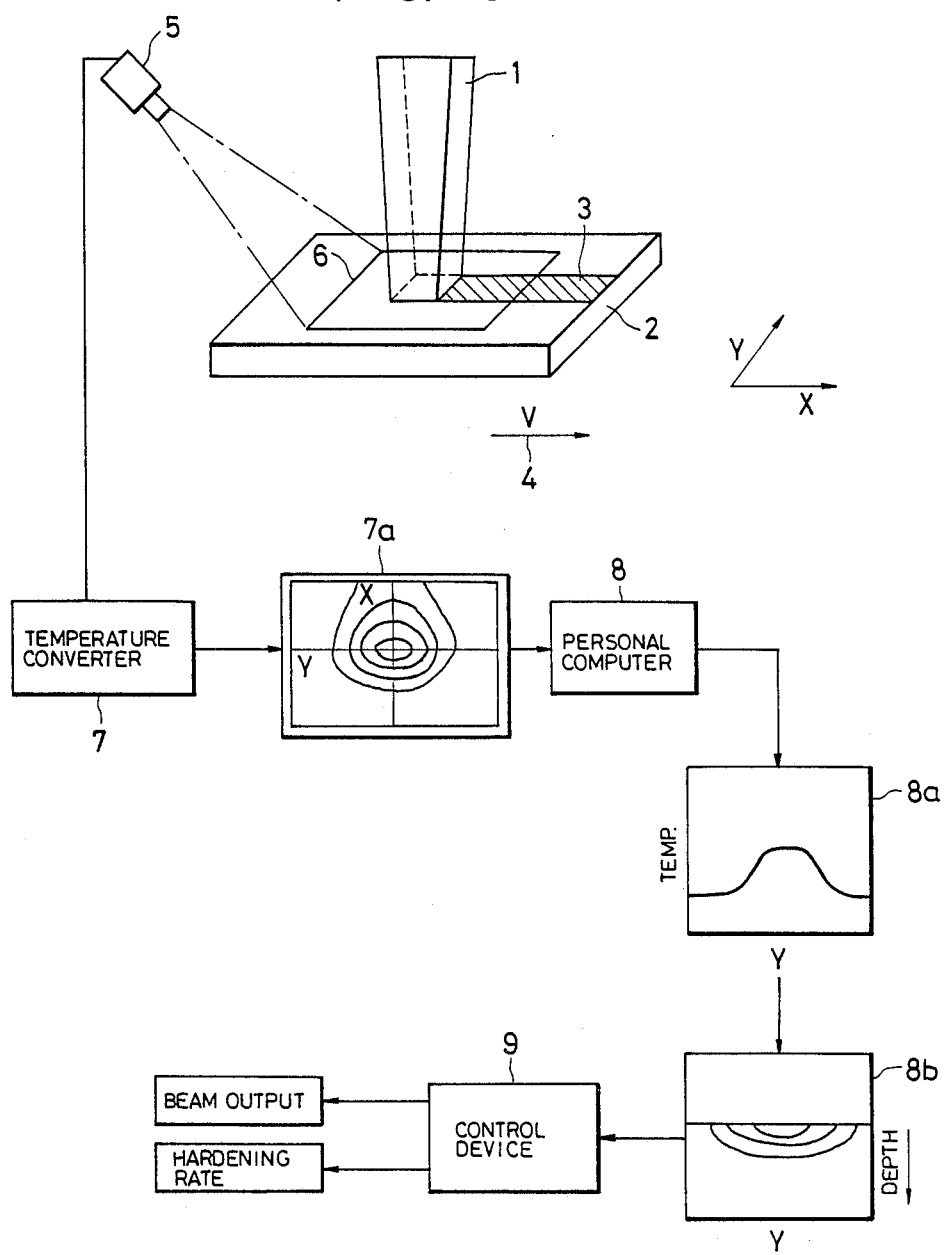
FIGS. 3 and 5 are views showing the constructions of a control apparatus for energy beam hardening according to another embodiment of the present invention.

FIG. 3 is a view showing the construction of a control apparatus for an energy beam hardening according to another embodiment of the present invention. In this embodiment, the arrangement are substantially the same as the first embodiment in FIG. 1 except that an infrared ray detector 5 is disposed on the same axis as the moving direction 4 of the material 2 to be hardened, and the detailed description thereof will be therefore omitted.

Figure 4:
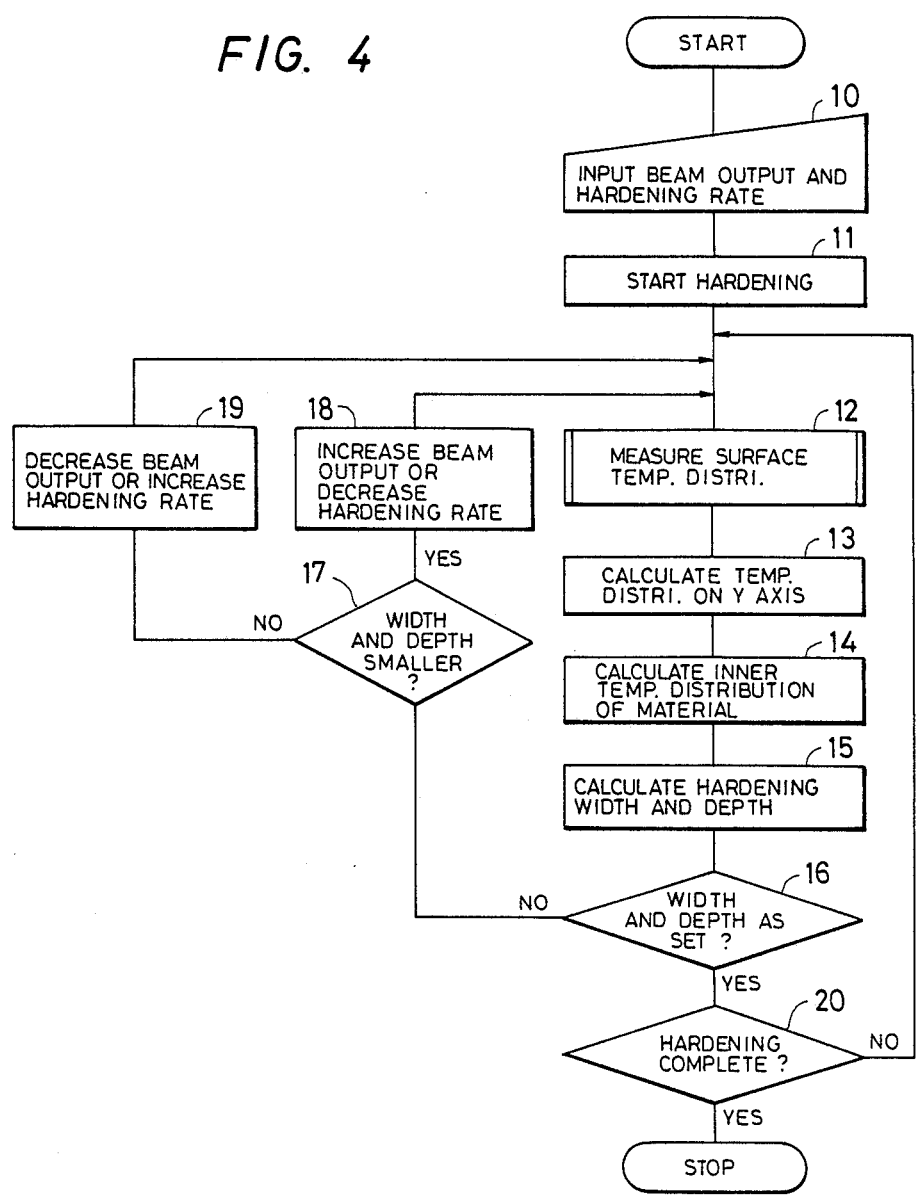
FIGS. 4 and 6 are flowcharts for describing the operations of the apparatus in FIGS. 3 and 5.

FIG. 4 is a flowchart for describing the operation of the another embodiment of the control apparatus in FIG. 3.

In the control apparatus for the energy beam hardening constructed as described above, hardening step is started under arbitrary hardening conditions in steps 10 and 11, and an infrared ray from the hardened portion of the material 2 to be hardened, as detected by the infrared ray detector 5 is converted by a temperature converter 7 as two-dimensional temperature distribution 7a on the surface of the material 2 as shown in FIG. 3 in step 12. In FIG. 3, X-axis corresponds to the moving direction 4 of the hardened material 2, and Y-axis corresponds to the direction perpendicular to the moving direction 4 of the hardened material 2. The temperature distribution of the surface of the hardened material 2 is inputted to a calculation processor, i.e., a personal computer 8, which, in turn, obtains one-dimensional temperature distribution 8a on the Y-axis showing the maximum temperature in step 13. Temperature distribution 8a in the hardened material 2 is calculate according to the temperature distribution 8a on the Y-axis, and the temperature distribution before the beam from the crossing point 0 of the X-axis and the Y-axis of the two-dimensional temperature distribution 7b on the surface of the material 2 in step 14. The depthwise length of the hardened portion of the hardened material 2 is converted by the maximum arriving temperature and the temperature gradient $(\partial T/\partial Y)$ until arriving at the maximum arriving temperature by referring to the data base stored therein. The portion which has arrived at the transforming point Ac$_3$ of the temperature distribution 8b of the interior of the hardened material 2 thus obtained is hardened, and the hardened quality such as hardened width and depth of the hardened portion of the hardened material 2 can be presumed by the temperature distribution in step 15. Then, the presumed hardening characteristics are compared with desired values (set initially) in step 16. If the presumed hardening characteristics are different from the set values, the output and hardening velocity of the energy beam to obtain desired hardening characteristics are decided to increase or decrease in steps 17 to 19. The output and moving velocity of the energy beam are controlled by the energy beam control means 9 according to an output of energy beam deciding means, i.e., personal computer 8. If the presumed hardening characteristics are desired value, the process is returned to the step 12 of measuring the temperature distribution of the surface of the hardened material 2, and the steps are repeated until the hardening of the material 2 is ended.

Figure 5:
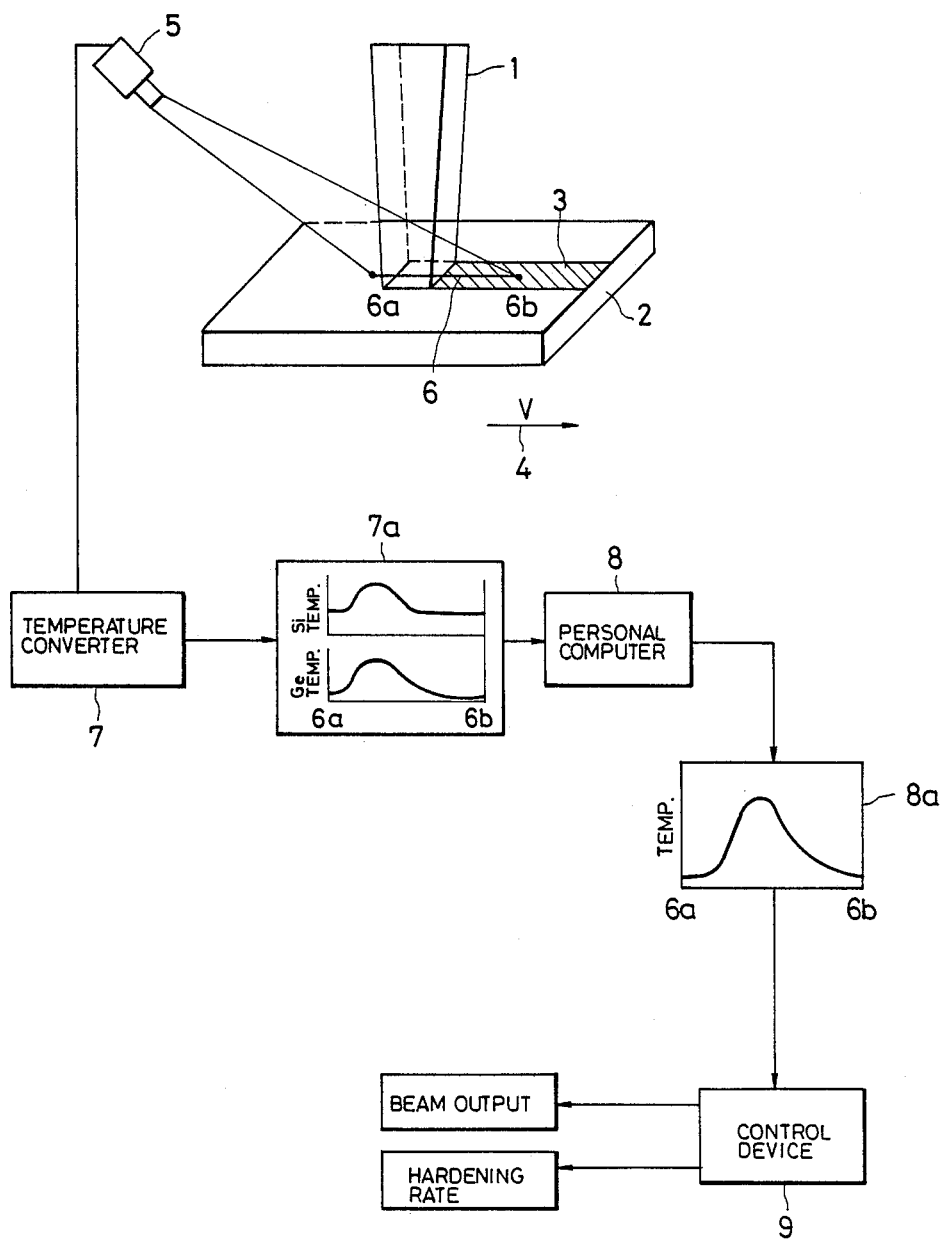

FIG. 5 is a view showing the construction of still another embodiment of a control apparatus for energy beam hardening according to the present invention. In this embodiment, the arrangement is substantially the same as that of the first embodiment in FIG. 1 except that infrared rays of 0.9 and 1.6 microns of wavelengths are detected by an Si sensor and a Ge sensor (associated in an infrared ray detector 5) and a measuring range is, for example, approx. 30 mm on the same axis as the moving direction of a material 2 to be hardened or an energy beam 3, and detailed description thereof will therefore be omitted.

Figure 6:
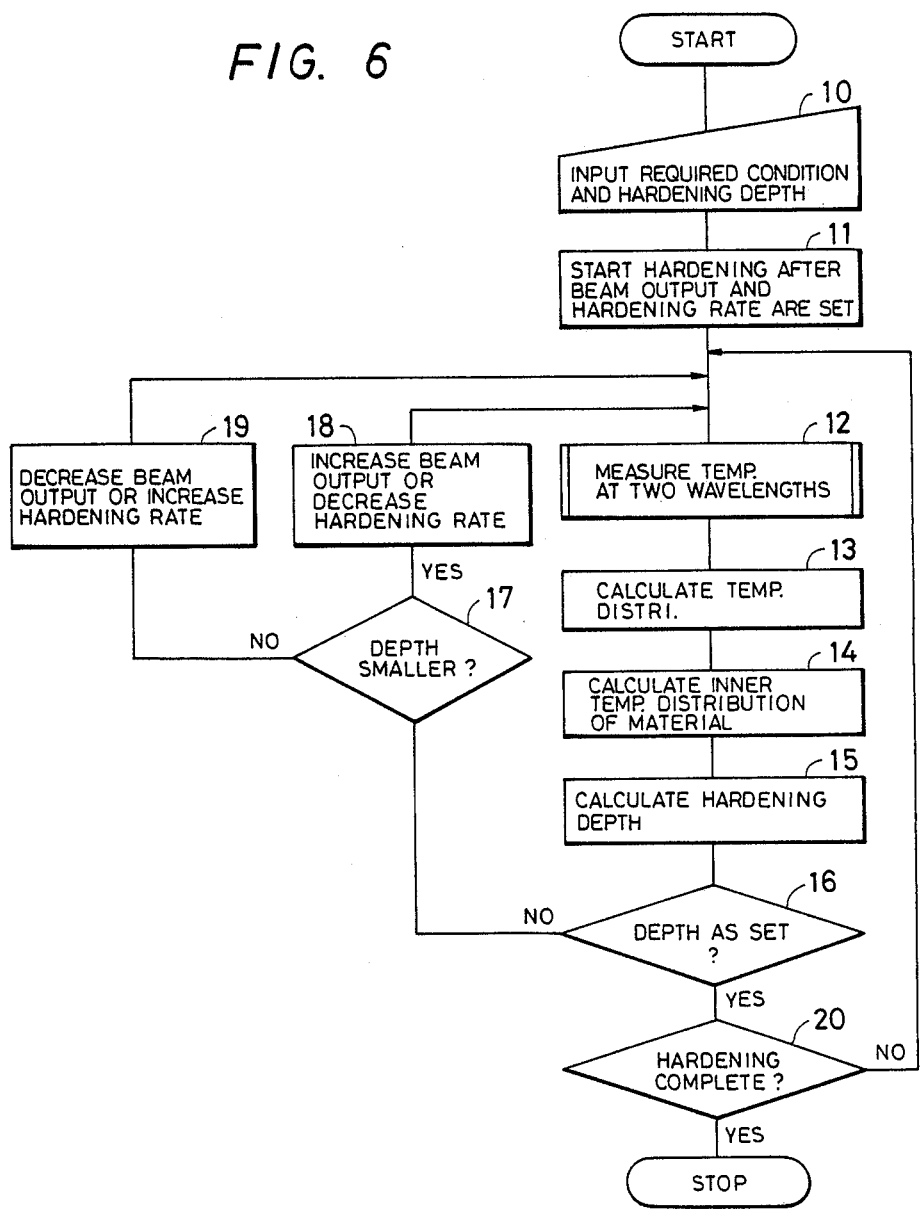

FIG. 6 is a flowchart for describing the operation of the control apparatus in FIG. 5.

Figure 7:
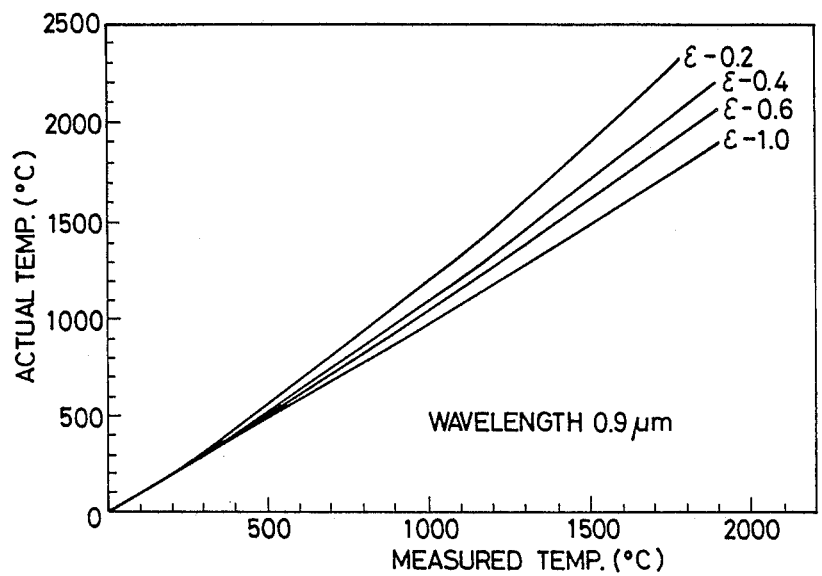
FIGS. 7 and 8 are graphs showing measuring errors in wavelengths of 0.9 and 1.6 microns.
Figure 8:
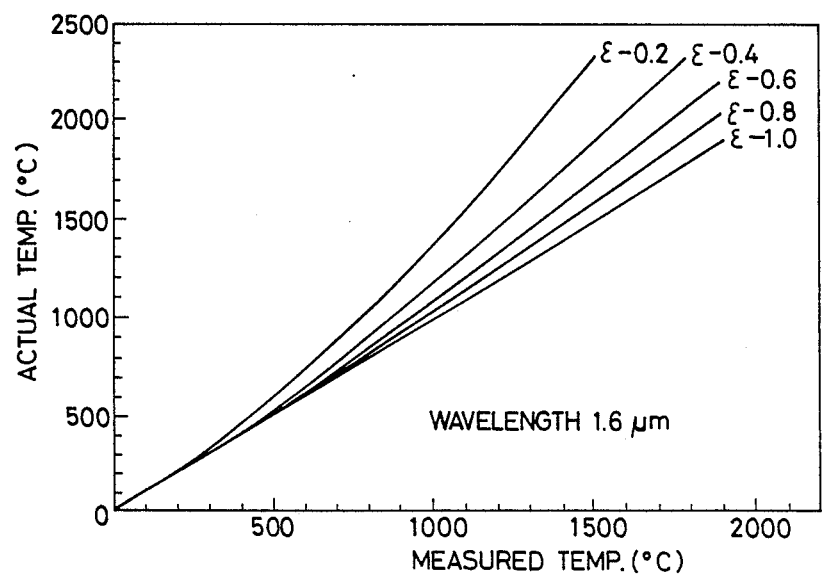
Figure 9:
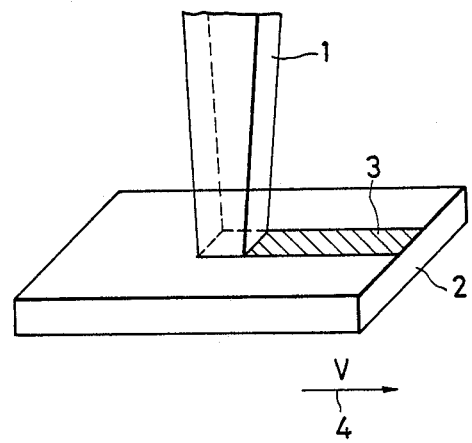
FIG. 9 is a perspective view showing an essential portion of a conventional energy beam hardening apparatus.

In the control apparatus for energy beam hardening constructed as described above, a hardening depth is, for example, input to the apparatus as requirement conditions in step 10, adequate beam output and hardening velocity are selected from data base stored therein to set hardening conditions, and hardening step is started in step 11. Then, two types of detection signals detected by the infrared ray detector 5 are converted by a temperature converter 7 as shown in FIG. 5 as temperature distribution 7a in step 12. The temperature distribution 7a is inputted to a data processor 8, i.e., a personal computer, a temperature distribution 8a having small measuring error and high accuracy is calculated with the two data in step 13. As shown in FIGS. 7 and 8, an infrared ray temperature measurement alters according to an emissivity $\xi$ affected by the surface state of the material 2 so that difference from an intrinsic temperature, i.e., measuring error is increased as the temperature rises higher. The variations are different depending upon the wavelength to be measured so that the shorter the measuring wavelength is, the small the influence becomes. Thus, a sensor of short wavelength is advantageous, and an Si sensor having 0.9 micron of shortest wavelength available in practical use can stably measure 800° C. or higher of temperature. Thus, the temperature of 800° C. or lower is measured by a Ge sensor having 1.6 micron of wavelength slightly shorter than the Si which can accurately measure to approx. 300° C. The emissivity $\xi$ of the hardened material 2 falls in a range of 0.4 to 0.7. When the temperature was converted by setting the emissivity to approx. 0.6, the temperature could be measured in accuracy of ±30° C. in the necessary temperature range. As described above, the temperature distribution 8a of the interior of the hardened material 2 is obtained by thermal conduction as a base from the accurately obtained temperature distribution 7a in step 14. Then, the hardening characteristics, i.e., hardening depth is converted with the maximum arriving temperature and the temperature gradient ($\partial T/\partial Y$) until arriving at the maximum arriving temperature by referring to data base stored therein. A portion which has arrived at transformation point $Ac_3$ in the temperature distribution in the interior of the hardened material thus obtained is hardened, and hardening quality such as hardened depth can be presumed by the temperature distribution in step 15. Then, the presumed hardening characteristics are compared with desired values (set initially) in step 16. If the presumed hardening characteristics are different from the set values, the output and hardening velocity of the energy beam are decided to increase or decrease to obtain desired hardening characteristics in steps 17 to 19. The output and moving velocity of the energy beam are controlled by the control means 9 according to the output of energy beam deciding means, i.e., a personal computer 8. If the presumed hardening characteristics are desired value, the process is returned to the step 12 of measuring temperature distribution of the surface of the material 2, and the steps are repeated until the hardening of the material 2 to be hardened is ended.

In the embodiment described above, a detecting element of the infrared ray detector 5 employs two types of Si and Ge. However, other sensors may be used. The other sensors of two types preferably have detecting wavelengths of a range of 0.7 to 1.1 microns and 1.4 to 2.0 microns in response to the detecting temperature ranges. When the temperature detecting range is wide, three or more types of sensors may be employed, and when narrow, one type of sensor may be used to accurately measure the temperatures.

In the embodiments described above, the energy beam has been employed the laser beam. However, the energy beam may also employ an electron beam, and the same advantages as those in the above embodiments will be similarly obtained.

In the embodiments described above, the material 2 to be hardened has been moved. However, the laser beam 1 may be moved instead.

According to the present invention as described above, the control apparatus for energy beam hardening comprises the electromagnetic wave detector for detecting an electromagnetic wave irradiated from the surface of a hardened portion to which an energy beam is being emitted or emitted, the temperature converter for converting a detection signal from the electromagnetic wave detector to a temperature, the hardening characteristics presuming means for presuming hardening characteristics by processing temperature distribution data from the temperature converter, the energy beam deciding means for deciding the output and moving velocity of the energy beam emitted to obtain desired hardening characteristics and according to hardening characteristics to be presumed, and the energy beam control means for controlling at least one of the output and moving velocity of the energy beam according to the output of the energy beam deciding means, thereby suppressing the irregularities in the hardening characteristics. Therefore, even if the pretreating conditions and the beam output before hardening are altered, stable hardening characteristics can be always obtained.

What is claimed is:

1. A control apparatus for energy beam surface hardening, comprising:
   (a) an electromagnetic wave detector (5) for detecting an electromagnetic wave irradiated from a surface portion (6) of a workpiece (2) onto which a high intensity energy beam (1) is incident,
   (b) a temperature converter (7) for converting a detection signal from the electromagnetic wave detector into two dimensional temperature distribution data (7a),
   (c) means (8) for processing temperature distribution data from the temperature converter to derive assumed surface hardening characteristics therefrom, (d) means (8) for comparing said assumed surface hardening characteristics with predetermined, desired surface hardening characteristics, and (e) energy beam control means (9) for controlling at least one of the output and moving velocity of the energy beam according to the output of the comparing means to thereby suppress irregularities in the surface hardening characteristics, wherein (f) said energy beam is controlled to heat said surface portion of the workpiece above the martensite and austenite transformation temperatures thereof but below the melting temperature such that surface hardening is effected by a martensite transformation.

2. The control apparatus as claimed in claim 1, wherein the assumed surface hardening characteristics are derived by processing the temperature distribution data from the temperature converter to obtain a temperature distribution curve in a direction perpendicular to a direction of movement of the energy beam relative to the workpiece.

3. The control apparatus as claimed in claim 1, wherein the assumed surface hardening characteristics are derived by processing the temperature distribution data from the temperature converter to obtain a temperature hysteresis curve of said surface portion of the workpiece.

4. The control apparatus as claimed in claim 1 wherein the energy beam is a laser beam.

5. The control apparatus as claimed in claim 1 wherein the energy beam is an electron beam.

6. The control apparatus as claimed in claim 1, wherein the electromagnetic wave to be detected is a light wave, and its wavelength range is equal to at least 0.7 microns and lower than 15 microns.

7. The control apparatus as claimed in claim 1, wherein the electromagnetic wave detector detects two electromagnetic waves having different wavelengths.

8. The control apparatus as claimed in claim 7, wherein one of the two electromagnetic waves has a wavelength equal to at least 0.7 microns and lower than 1.1 microns, and another of the two electromagnetic waves has a wavelength equal to at least 1.4 microns and lower than 2 microns.

9. The control apparatus as claimed in claim 1, wherein the positional relationship between the electromagnetic wave detector and energy beam emitting position is fixed.

10. The control apparatus as claimed in any of claims 1 to 9, wherein the electromagnetic wave detector is disposed in a direction perpendicular to a direction of movement of the workpiece.

11. The control apparatus as claimed in any of claims 1 to 9, wherein the electromagnetic wave detector is disposed in a direction parallel to a direction of movement of the workpiece.

12. The control apparatus as claimed in any of claims 1 to 9, wherein the processing means and the comparing means comprise a personal computer.

* * * * *